United States Patent Office 2,916,514
Patented Dec. 8, 1959

2,916,514

SAPONIFICATION OF TOLUIC ACID ESTERS

Charles R. Cartwright, St. Simons Island, Ga., assignor to Hercules Powder Company, Wilmington, Del., a corporation of Delaware No Drawing. Application December 31, 1957
Serial No. 706,245

6 Claims. (Cl. 260—515)

This invention relates to the saponification of toluic acid alkyl esters and in particular to the saponification of methyl m-toluate.

The hydrolysis of esters is a well-known reaction. The reaction is reversible and is catalyzed by acids or alkalies. In many instances it is preferred to utilize an alkali catalyst in an amount sufficient to neutralize the organic acid as it is formed, thus removing the acid as one of the components of the equilibrium mixture and rendering the reaction irreversible and quantitative. Since many esters are nearly insoluble in water, they are hydrolyzed by water and a trace of acid only very slowly. The solubility problem can be overcome by using as solvent the alcohol corresponding to that involved in the ester, but in the acid catalyzed system this results in repression of the hydrolysis reaction. However, when an alkali is used such repression is of no consequence since removal of the organic acid as its salt drives the reaction to completion.

Thus it is apparent that the preferred conditions for saponification of many organic acid esters included the use of an alcohol solvent and an alkali as catalyst and neutralizing agent. However, it has been found that application of such conditions to toluic acid lower alkyl esters results in a reaction which has a long induction period and which is difficult to control once it has started.

Now in accordance with the present invention it has been found that the saponification of toluic acid lower alkyl esters in the presence of an aqueous alkali may be carried out smoothly and efficiently in a reasonable length of time by forming a mixture containing an aqueous alkali and a sodium or potassium salt of a toluic acid, heating said mixture, adding thereto a toluic acid lower alkyl ester, and heating the total reaction mixture so formed until saponification is complete. The process is distinguished from prior procedures primarily in having present the toluic acid salt. The process is particularly applicable to batchwise saponification, but also is important in the start-up of a continuous process. The process of this invention is more particularly set forth in the following specific examples. All parts and percentages in this specification and claims are by weight unless otherwise noted.

Example 1

A reaction vessel equipped with a stirrer, thermometer, reflux condenser and an external circulating pump was charged with 11,980 parts of aqueous sodium hydroxide of 25% concentration and with 880 parts of sodium toluate. The resulting aqueous solution was heated to a temperature of 102°–110° C. with stirring and circulation through the external pump. There then was gradually introduced into the aqueous solution at a rate of about 40 parts per minute 7,480 parts of methyl toluate. The ester was a mixture of methyl-m-toluate and methyl-p-toluate in a ratio of about 85:15. Additional water was added to the reaction vessel as needed to prevent solids from precipitating. Upon completion of the reaction, the reaction mixture was boiled to remove residual methanol. The product then was acidified with concentrated sulfuric acid at a temperature between 105° and 115° C. to a pH of 2–3. After settling at a temperature of 105°–115° C., the aqueous phase was removed and toluene was added while allowing the temperature to drop to 75°–85° C. The toluene solution of toluic acid was washed with two half-volume portions of water to remove residual sulfuric acid, then heated to 130°–160° C. to remove most of the toluene. Toluic acid with about 15% remaining toluene was recovered from the reaction vessel as a liquid solution. At all times during the saponification, the reaction proceeded smoothly.

Example 2

A reaction vessel equipped with a stirrer, thermometer and reflux condenser was charged with 791 parts of aqueous sodium hydroxide of 25% concentration. To this was added 200 parts of toluic acid. This gave a solution containing 234 parts of sodium toluate and 140 parts of sodium hydroxide. The solution was heated to a temperature of 100°–106° C. with agitation, and there then was introduced into the reaction vessel 482 parts of methyl toluate over a period of about 50 minutes. One-half of the methyl toluate was a mixture of the meta and para isomers in the ratio of about 90:10; the other half was a mixture of these isomers in the ratio of about 40:60. During addition of the ester and for an additional 90 minutes the condenser was operated under total reflux. The condenser was then permitted to warm up and a methanol-water mixture was taken as overhead, additional water being added to the reaction vessel to prevent solids from precipitating. When the specific gravity of the distillate indicated that no more methonol was being distilled, the condenser again was placed under reflux conditions and the reaction mixture was acidified with 95% sulfuric acid to a pH of 2–3. After settling at a temperature of 105–110° C. the aqueous phase was removed and toluene was added while allowing the temperature to drop to 80–85° C. The toluene solution of toluic acid was washed with two half-volume portions of water, then heated to 130–160° C. to remove the toluene. Molten toluic acid was recovered from the reaction vessel. As in Example 1, the saponification reaction proceeded smoothly and with no induction period.

Example 3

Substantial duplication of the procedure of Example 2 except that no sodium toluate was present resulted in an induction period, then a sudden and vigorous reaction which was difficult to keep under control.

Example 4

Duplication of Example 3 except to include sufficient methanol to act as solvent gave substantially no improvement.

The examples have shown the saponification of the methyl ester of mixtures of m- and p-toluic acids. However, any lower alkyl ester of any of the isomeric toluic acids or mixtures of the latter may be utilized. The mixtures may be meta-para, ortho-meta, ortho-para or ortho-meta-para, and the relative amounts of the isomers may be widely varied. The preferred materials are the methyl and ethyl esters of a mixture of m- and p-toluic acids wherein the ratio of meta to para is at least 80:20 and is preferably at least 85:15. These particular isomers and the ratio thereof are of importance, since the acids formed by the saponification reaction are used in preparation of N,N-diethyl-m-toluamide, which has recently been found to be an excellent insect repellent. The higher the meta isomer content of the toluic acid, the more effective the diethyltoluamide product is as an insect repellent. The process also may be used with the propyl and butyl esters, and by "lower alkyl" in this specification and claims is meant alkyl groups containing from 1 to 4 carbon atoms.

The saponifications shown in the examples were carried out using aqueous sodium hydroxide. However, potassium hydroxide also is operable, and the term "alkali" as used in this specification and claims is intended to refer only to sodium hydroxide and potassium hydroxide. The concentration of the aqueous alkali may be between about 10 and about 50%, and the amount of alkali itself in relation to the amount of ester will be between about 40 and about 50% by weight.

As illustrated by the examples, sodium toluate is effective in initiating the saponification reaction. However, any of the various toluic acids and mixtures thereof may be used to produce the desired salt initiator and the metal portion of the salt will be composed of one or the other of sodium and potassium or mixtures thereof. It is preferred to use the salt corresponding to the alkali used. The amount of the salt may be from about 5 to about 20%, preferably between about 10 and about 15%, based on the amount of ester to be saponified.

The temperature to be used during the saponification may be between about 80° and about 150° C., although a preferable range is about 100° to about 115° C. The length of time involved is not critical, it only being necessary to carry out the saponification for a sufficient length of time to complete the reaction. However, in comparison to the same reaction carried out in the absence of a toluic acid alkali metal salt the time will be considerably shorter.

The process of this invention is particularly useful in preparing the toluic acid starting material needed for the manufacture of N,N-diethyl-m-toluamide, which is an outstanding insect repellent.

What I claim and desire to protect by Letters Patent is:

1. A process for the saponification of a toluic acid lower alkyl ester which comprises forming a mixture containing an aqueous alkali metal hydroxide and a toluic acid salt selected from the group consisting of the sodium and potassium salts and mixtures thereof, in which mixture the alkali metal hydroxide has a concentration of 10–50% and is by weight 40–50% of the weight of the ester to be saponified and the toluic acid salt is by weight 5–20% of the weight of the ester to be saponified heating said mixture, adding thereto a toluic acid lower alkyl ester, and heating the total reaction mixture so formed at a temperature in the range of 80–150° C. until saponification is complete.

2. The process of claim 1 wherein the aqueous alkali is aqueous sodium hydroxide.

3. The process of claim 1 wherein the toluic acid ester is methyl m-toluate.

4. The process of claim 1 wherein the toluic acid ester is methyl p-toluate.

5. The process of claim 1 wherein the toluic acid ester is a mixture of methyl m-toluate and methyl p-toluate in the ratio of about 85:15.

6. The process of claim 5 wherein the aqueous alkali is aqueous sodium hydroxide.

References Cited in the file of this patent

Wagner et al.: Synthetic Organic Chemistry, pp. 416–417 (1953).

Weissberger: Technique of Organic Chemistry, vol. VIII, pages 428–429 (1953).

Gilman: Organic Chemistry, vol. III, pp. 118–120 (1953).